(12) United States Patent
Lambert

(10) Patent No.: US 9,406,308 B1
(45) Date of Patent: Aug. 2, 2016

(54) ECHO CANCELLATION VIA FREQUENCY DOMAIN MODULATION

(71) Applicant: Google Inc., Mt. View, CA (US)

(72) Inventor: Terrence Ryan Lambert, Foster City, CA (US)

(73) Assignee: GOOGLE INC., Mountain View, CA (US)

( * ) Notice: Subject to any disclaimer, the term of this patent is extended or adjusted under 35 U.S.C. 154(b) by 160 days.

(21) Appl. No.: 13/959,100

(22) Filed: Aug. 5, 2013

(51) Int. Cl.
*G10L 21/02* (2013.01)
(52) U.S. Cl.
CPC ...................................... *G10L 21/02* (2013.01)
(58) Field of Classification Search
CPC .......... H04M 9/082; H04M 3/56; H04M 1/20
See application file for complete search history.

(56) References Cited

U.S. PATENT DOCUMENTS

| | | | |
|---|---|---|---|
| 5,434,912 A * | 7/1995 | Boyer et al. | 379/202.01 |
| 6,366,880 B1 | 4/2002 | Ashley | |
| 7,003,099 B1 | 2/2006 | Zhang et al. | |
| 7,286,980 B2 | 10/2007 | Wang et al. | |
| 7,680,653 B2 | 3/2010 | Yeldener | |
| 2008/0253553 A1* | 10/2008 | Li et al. | 379/406.05 |
| 2009/0304198 A1 | 12/2009 | Herre et al. | |
| 2010/0189274 A1* | 7/2010 | Thaden et al. | 381/66 |
| 2011/0077016 A1* | 3/2011 | Stolyar et al. | 455/450 |
| 2012/0158163 A1 | 6/2012 | Andersen | |

\* cited by examiner

*Primary Examiner* — Shreyans Patel
(74) *Attorney, Agent, or Firm* — Lowenstein Sandler LLP

(57) ABSTRACT

Methods, systems, and computer programs are presented for suppressing echo in network communications. One method includes an operation for filtering, with a first comb filter, a first audio signal received over a network resulting in a first combed signal. The first combed signal is sent to one or more speakers. Further, the method includes an operation for filtering, with a second comb filter, a second audio signal received from a microphone, resulting in a second combed signal. The second comb filter is the inverse of the first comb filter. In addition, the method includes an operation for generating an interpolated audio signal by interpolating the second combed signal to add signal in frequency bands filtered by the second comb filter. The interpolated audio signal is then transmitted to a remote entity over the network.

20 Claims, 9 Drawing Sheets

ECHO CANCELLATION VIA FREQUENCY DOMAIN MODULATION

BACKGROUND

1. Field of the Invention

The present embodiments relate to methods for eliminating echo in audio signals, and more particularly, methods, systems, and computer programs for eliminating echo for users communicating over a network connection.

2. Description of the Related Art

When having a conversation with a remote user in hands-free mode (e.g., a speaker mode on a mobile phone, hands-free video conferencing, etc.), sometimes users receive a reflection of their own voice because the sound of their voice is captured by the microphone in the other end of the conversation. This is referred to as echo, because the sound originated by a user comes back to the user.

In the presence of possible echo reflection, when the second party at the other end speaks, the voice from the second party may be mixed with the echo from the first party before sending the combination to the first party. This may result in distortion of the voice from the second party as perceived by the first party, lowering the quality of the communication exchange.

Echo cancellation is the process by which echo is eliminated from the signal received by a party in a network communication. Solutions have been designed for echo elimination, such as by using multiple microphones to perform voice analysis and filtering and only the voice from the user. However, audio echo cancellation may be a difficult problem to resolve due to time domain recognition of the echoed signal coupled with amplitude distortion. Typically, successful echo cancellation utilizing this approach requires recognition of partial signals over effectively large time intervals, leading to high buffering and computational costs. Further, when additional desired signal input (e.g., speech) is added, there is the risk of either canceling the desired signal within a band gap, or non-recognition of the desired signal, resulting in heightened noise.

What is needed is an echo cancellation system that provides good sound quality, may be operated with one or more microphones, and does not require a large amount of computational resources.

It is in this context that embodiments arise.

SUMMARY

Methods, devices, systems, and computer programs are presented for echo suppression in networked communications. It should be appreciated that the present embodiments can be implemented in numerous ways, such as a method, an apparatus, a system, a device, or a computer program on a computer readable medium. Several embodiments are described below.

In one embodiment, a method for suppressing echo in an audio conversation held over a network includes an operation for filtering, with a first comb filter, a first audio signal received over a network to obtain a first combed signal. Further, the method includes operations for sending the first combed signal to one or more speakers, and for filtering, with a second comb filter, a second audio signal received from a microphone to obtain a second combed signal. The second comb filter is the inverse of the first comb filter, and the microphone is in proximity to the one or more speakers and is operable to capture an output of the one or more speakers. The filtering with the second comb filter suppresses an echo of the first audio signal. In addition, the method includes an operation for generating an interpolated audio signal by interpolating the second combed signal to add signal in frequency bands filtered by the second comb filter. The interpolated audio signal is transmitted over the network.

In another embodiment, a method for suppressing echo in network communications is provided. The method includes an operation for filtering, with a first comb filter, a first audio signal received over a network resulting in a first combed signal. The first combed signal is sent to one or more speakers. Further, the method includes an operation for filtering, with a second comb filter, a second audio signal received from a microphone, resulting in a second combed signal. The second comb filter is the inverse of the first comb filter. In addition, the method includes an operation for generating an interpolated audio signal by interpolating the second combed signal to add signal in frequency bands filtered by the second comb filter. The interpolated audio signal is then transmitted to a remote entity over the network.

These and other embodiments can include one or more of the following features:

The comb filter includes a plurality of frequency bands that alternate between first frequency bands for cutting off signal within, and second frequency bands for passing-through signal within.

Filtering with the first comb filter includes eliminating signals from the first audio signal in the first frequency bands; and passing-through signals from the first audio signal in the second frequency bands.

Filtering with the second comb filter includes eliminating signals from the second audio signal in the second frequency bands; and passing-through signals from the second audio signal in the first frequency bands.

The microphone is in an environment where the microphone captures an output of the one or more speakers.

The microphone and the speaker are coupled to a personal computer.

The microphone and the speaker are integrated within a mobile phone.

Interfacing with a communication server over the network to set up an audio conversation over the network.

The first comb filter includes a plurality of frequency bands of equal size.

In one embodiment, operations of the methods presented herein are performed by a computer program when executed by one or more processors, the computer program being embedded in a non-transitory computer-readable storage medium. In another embodiment, a Digital Signal Processor (DSP) is utilized to implement one or more of the operations of the methods.

In another embodiment, a system for suppressing echo invoice communications includes a speaker, a microphone, an input processor, and an output processor. The input processor is operable to filter, with a first comb filter, a first audio signal received over a network to obtain a first combed signal, and the input processor is further operable to send the first combed signal to the speaker. The output processor is operable to filter, with a second comb filter, a second audio signal received from the microphone to obtain a second combed signal, the second comb filter being an inverse of the first comb filter. In addition, the output processor is operable to generate an interpolated audio signal by interpolating the second combed signal to add signal in frequency bands filtered by the second comb filter. The output processor is further operable to transmit the interpolated audio signal over the network.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, apparatus, and computer programs for suppressing echo. It will be apparent, that the present embodiments may be practiced without some or all of these specific details. In other instances, well known process operations have not been described in detail in order not to unnecessarily obscure the present embodiments.

Figure 1:
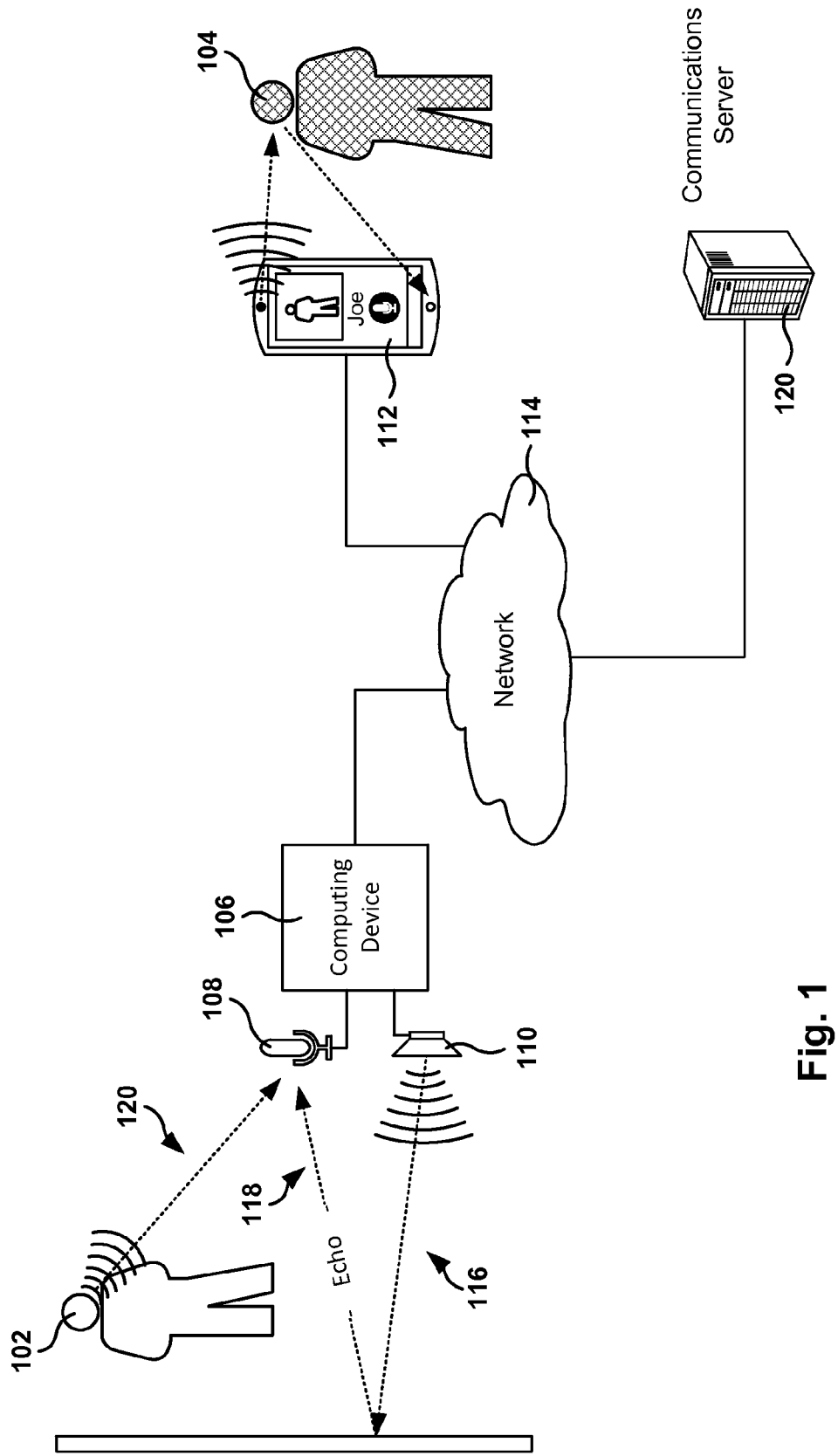
FIG. 1 illustrates the echo problem in network conversations, according to one embodiment.

FIG. 1 illustrates the echo problem in network conversations, according to one embodiment. Users 102 and 104 are engaged in a conversation taking place over a network 114. In the embodiment of FIG. 1, users 102 and 104 are having a voice-only conversation, but the principles described herein to eliminate echo may also be applied to the audio signals in videoconferencing, or any other communication that includes audio exchange. Further, the embodiments described herein apply to any type of network communications, including phone communications, voice over IP (VoIP) communications, communications over a mobile network, videoconferencing, voice exchanges on a social network, multi-party conferences (e.g., two or more users communicating simultaneously in conference mode), etc.

User 102 utilizes computing device 106 for the voice exchange, and user 104 utilizes a mobile smart phone 112. However, the principles of the embodiments may be utilized in any computing device capable of establishing voice communications, such as regular phones, mobile phones, PCs, laptops, tablets, smart terminals, TVs, conferencing systems, etc.

In one embodiment, a communications server 120 sets up the voice exchange between users 102 and 104. Communications server 120 interfaces with computing devices 106 and 112 to set up the voice exchange. After the voice exchange is set up, actual network communications may be transmitted through communications server 120 or may be transmitted end-to-end between devices 106 and 112, without requiring the voice signals to travel through communications server 120.

Computing device 106 is connected to microphone 108 and speaker 110. In some embodiments, the microphone and/or the speaker may be embedded in the computing device (e.g., a phone), or may be external and electrically coupled to the computing device 106 (e.g., a PC with microphone and speakers, a headset coupled to a computing device, etc.). User 104 utilizes mobile device 112 in hands-free mode, sometimes referred to as "speaker on" mode, where the mobile device is held away from the ear during operation.

When user 102 speaks, user 102 creates a voice signal (e.g., speech) 120 that reaches microphone 108. When the speech originated by user 104 reaches computing device 106, the speech is sent to speaker 110. Embodiments described herein are presented using speech as the audio exchanged between the two parties, but embodiments described herein may be used for any kind of audio, such as music, movies, etc.

The output signal 116 from the speaker may bounce around the environment where user 102 is situated (e.g., walls, furniture, framed pictures, or any other surface) to create an echo signal 118 that reaches microphone 108. Therefore, microphone 108 captures the desired speech from user 102 as well as the echo from the speech generated by the remote user. This echo signal 118 interferes with user 102 speech and may decrease the quality of the communications because the remote user will hear echo noise together with the speech from the remote user.

As used herein, an echo is a reflection of sound, arriving at the listener some time after the direct sound is created. In real life, echo may be produced by the bottom of a well, by a building, by the walls of an empty room, by the reflection of a canyon, etc. In communications, an echo is a reflection of a sound signal created by one party that is returned to the same party that originated the sound signal. The echo may be caused by the telecommunications media (e.g., echo created by a phone provider), or may be caused by a return of the sound signal caused by the environment of the receiving party. Embodiments presented herein suppress the echo created in the environment of the receiving party.

Unless the hard surface creating the echo is moving in the sound field, there is no frequency shift of the echo signal due to the Doppler effect. Some ultrasonic sensors in alarms and robotics applications set a sound field, and when something or somebody moves within the sound field, a Doppler shift in the frequency takes place, which is utilized to detect motion in the sound field.

Assuming that there is no motion of the surfaces generating the echo, the Doppler effect may be ignored, and a frequency domain-based solution may be utilized to suppress echo.

In one embodiment, echo suppression may be selectively turned on or off, depending on the operating conditions. In general, echo suppression will take place when there is a risk that the output from the speaker will reach the microphone. However, when there is no risk, or there is a low risk, echo suppression may be disabled. For example, if user 104 is conversing when the phone is placed next to the ear, then there is a low risk of echo. If user 102 uses headphones, then there is also low risk of echo, and echo suppression may be turned off.

Figure 2:
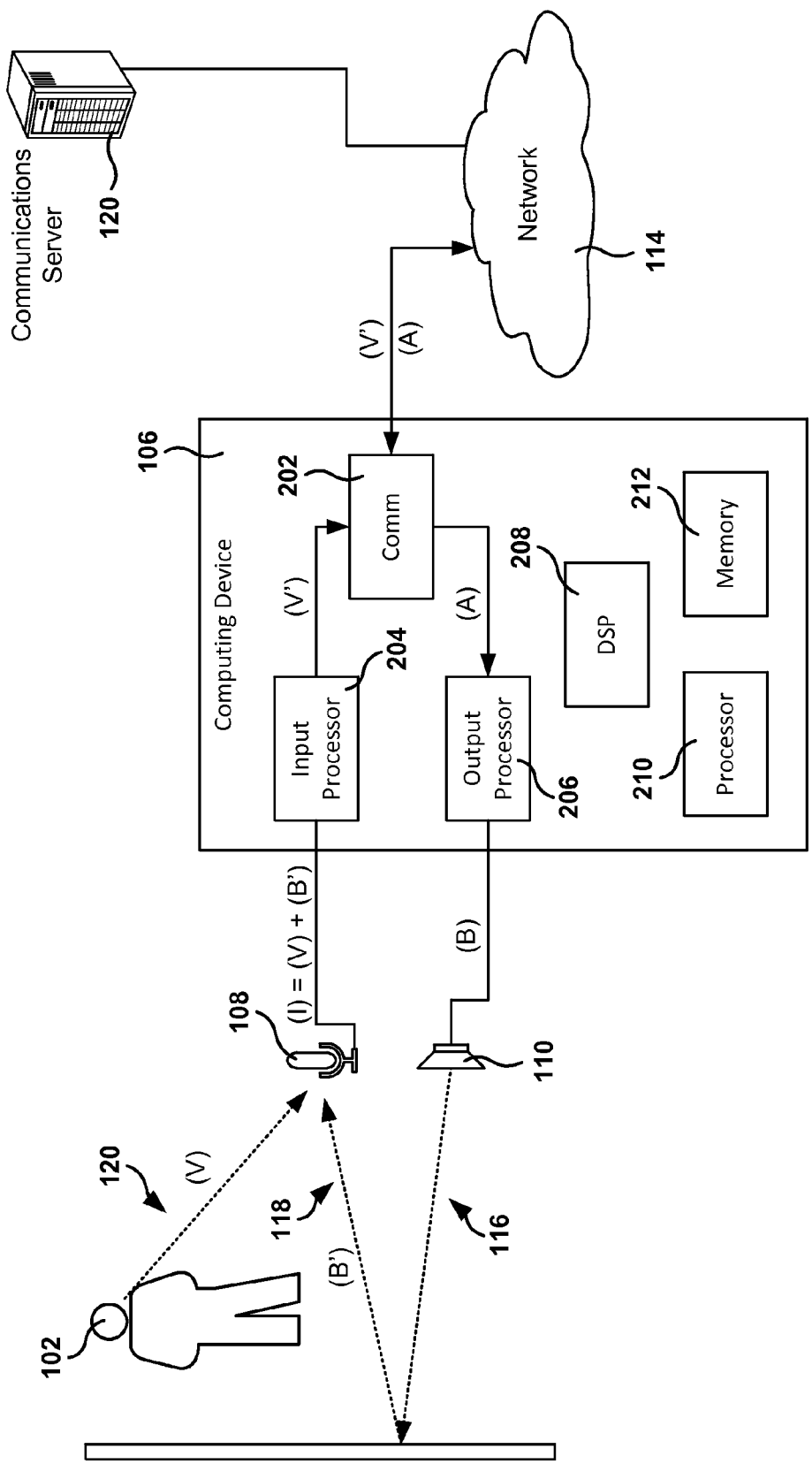
FIG. 2 is a simplified schematic diagram of a computer system for implementing embodiments described herein.

FIG. 2 is a simplified schematic diagram of a computer system for implementing embodiments described herein. Embodiments presented herein for echo cancellation utilize frequency domain modulation. A signal consisting of multiple simultaneously combined frequencies, such as speech, music, or other non-mono-frequency intelligence, may vary the frequency spectrum over time, and echo cancellation is normally considered a time interval problem. Instead, embodiments presented consider each sample over the frequency domain as a single frame, much like a single frame in a film or video, individually.

Taking into account that there are two sources of combined input signals—the echo from an earlier output signal (noise) and the input signal wished to be examined (intelligence)— how can intelligence be captured while noise be discarded? The answer is frequency division multiplexing between the input and the output signals.

In one embodiment, the computing device used for communications includes an input processor 204, an output processor 206, a communications module 202, a digital signal processor (DSP), a processor 210, and memory 212.

The communications module 202 manages the communications between computing device 106 and one or more remote computing devices for exchanging audio signals. The input processor 204 processes the incoming audio from microphone 108, and the output processor 206 processes the incoming audio from a remote party. The DSP 208 may be utilized to perform the different forms of signal processing described herein, but any type of signal processing may be used, such as dedicated hardware, firmware, or computer programs. Processor 210 is utilized to execute program instructions for some of the methods described herein, and memory 212 is used to store computer programs executed by processor 210, as well as to perform other memory-related operations within computing device 106.

The input processor 204 receives signal (I) and generates a signal (V') that is transferred to communications processor 202 for transmittal over the network 114 to a remote party. Output processor 206 receives signal (A), including audio from a remote party, and generates a signal (B) that is transmitted to speakers 110.

Input signal (I) includes the speech (V) generated by user 102 as well as an echo signal (B'). More details on these signals is provided below with reference to FIGS. 3-5B.

It is noted that the embodiment illustrated in FIG. 2 is exemplary. Other embodiments may utilize different modules, combine the functionality of several modules into one module, have additional processing modules, etc. The embodiments illustrated in FIG. 2 should therefore not be interpreted to be exclusive or limiting, but rather exemplary or illustrative.

Figure 3:
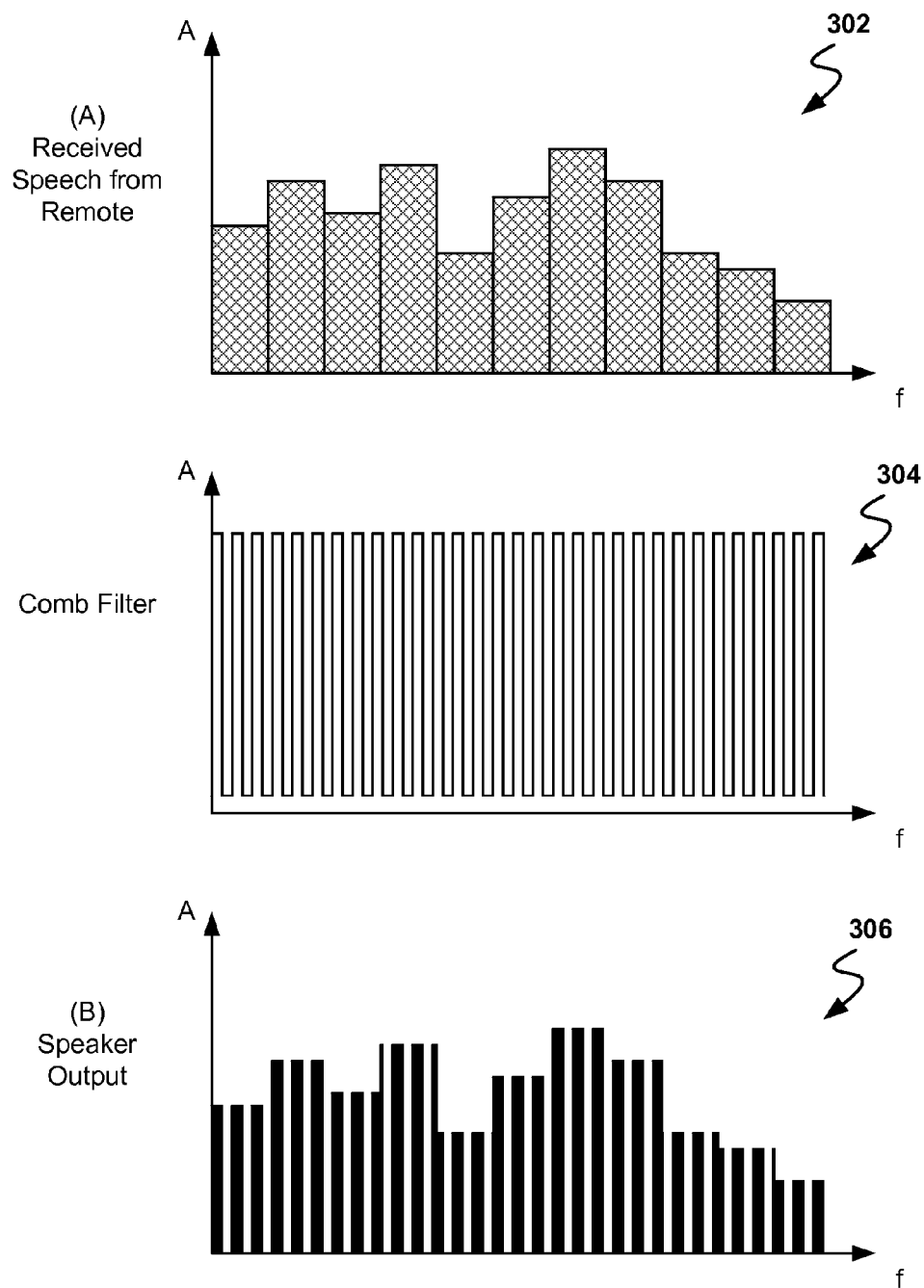
FIG. 3 illustrates the processing of a received audio signal before transmittal to one or more speakers, according to several embodiments.

FIG. 3 illustrates the processing of a received audio signal before transmittal to one or more speakers, according to several embodiments. Diagram 302 illustrates an exemplary speech signal (A) received from a remote party in a network communication operation. Diagram 302 shows the frequency spectrum of signal (A) with different amplitudes along the different frequencies. Of course, diagram 302 (and other diagrams presented herein) is a schematic representation of an approximate real frequency signal, which would typically have more peaks and valleys.

Diagram 304 illustrates the operation of a comb filter, where some frequencies are minimally attenuated (e.g., pass through) and some other frequencies are virtually eliminated (e.g., cut off). A comb filter is a device which processes an input signal to eliminate a plurality of frequency bands from the input signal. The frequency bands that are cut off are spaced along the frequency spectrum causing a frequency response curve that resembles a comb. In one embodiment, all the frequency bands have the same width, including the cut-off frequency bands the pass-through bands. Cut-off frequency bands are interlaced with the pass-through bands. In other words, in one embodiment, the comb filter includes a plurality of frequency bands that alternate between cut-off frequency bands that eliminate frequencies within the cut-off band, and pass-through frequency bands that leave unchanged the frequencies within the pass-through frequency bands.

However, in other embodiments the cut-off frequency bands and the pass frequency bands may have different sizes, and may vary in size along the frequency spectrum.

In one embodiment, the comb filter is implemented utilizing a DSP. In some embodiments, the comb filter is created by attenuating a feedback loop, but any type of comb filter maybe used. When a delayed copy of a signal is added to its original, certain frequency components will cancel themselves out because of the phase difference. Others will reinforce themselves in a similar fashion.

The result of applying the comb filter to signal (A) is signal (B), which is sent to one or more speakers. The comb filter is used to modulate the output signal in order to eliminate the echo, as described in more detail below. As illustrated in diagram 306, signal (B) is missing some frequency bands when compared to the original signal (A), the result of combing signal (A) with the comb filter.

The user does not perceive distortion in the output signal if the output signal is sampled at an appropriate rate. In one embodiment, the audio signal is sampled at around 44 kHz, the same sampling rate of an audio CD. However, other sampling rates may be utilized (e.g., 15 kHz-100 kHz). Therefore, the size of the filtering bands in the comb filter may be between 15 kHz and 100 kHz, although other values are also possible. What is needed is a comb filter that is fine enough so the output signal does not sound distorted.

Figure 4:
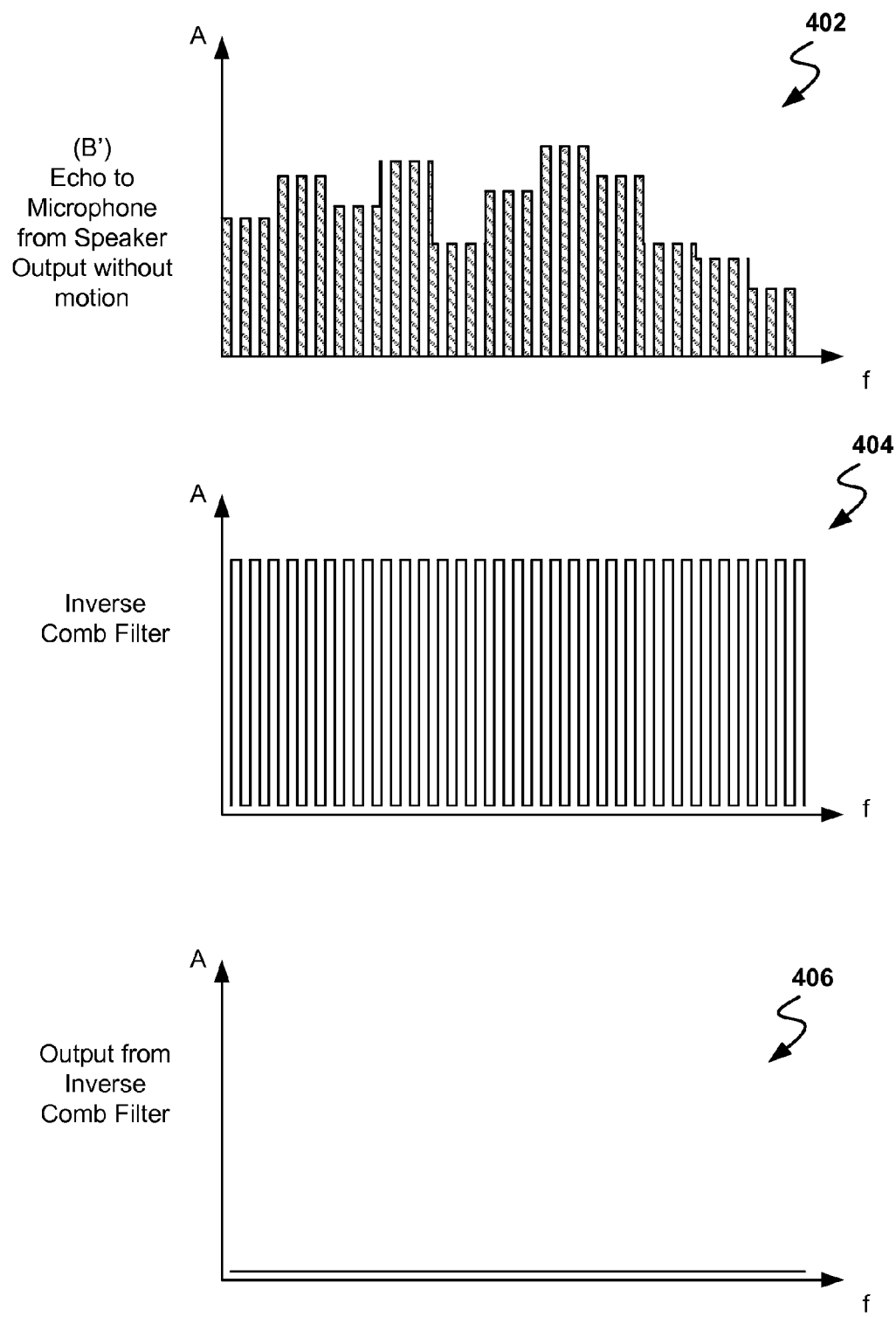
FIG. 4 illustrates the elimination of echo absent an input signal, according to one or more embodiments.

FIG. 4 illustrates the elimination of echo absent an input signal, according to one or more embodiments. Diagram 402 illustrates the signal (B') that is echoed back to the microphone. In the absence of motion within the environment, the echo signal (B') will be in the same frequency range as signal (B) that comes out of the speaker, although echo signal (B') may have the same or different amplitude.

If signal (B') is passed through an inverse comb filter (as shown in diagram 404), the result is a flat signal as shown in diagram 406. The flat signal of diagram 406 illustrates the echo suppression process. By using the inverse comb filter, the frequency bands that were transmitted to the environment are eliminated, resulting in the suppression of the echo.

An inverse comb filter of an original comb filter, is a comb filter that attenuates frequency bands that the original comb filter does not attenuate, and let pass-through frequency bands that the original filter attenuates. In other words, the inverse comb filter has an inverse filtering pattern from the original comb filter. If a signal is passed through both a comb filter and its inverse comb filter, in the ideal case, no signal is output because some of the frequencies are eliminated by the comb filter and the remaining frequencies are eliminated by the inverse comb filter.

Figure 5A:
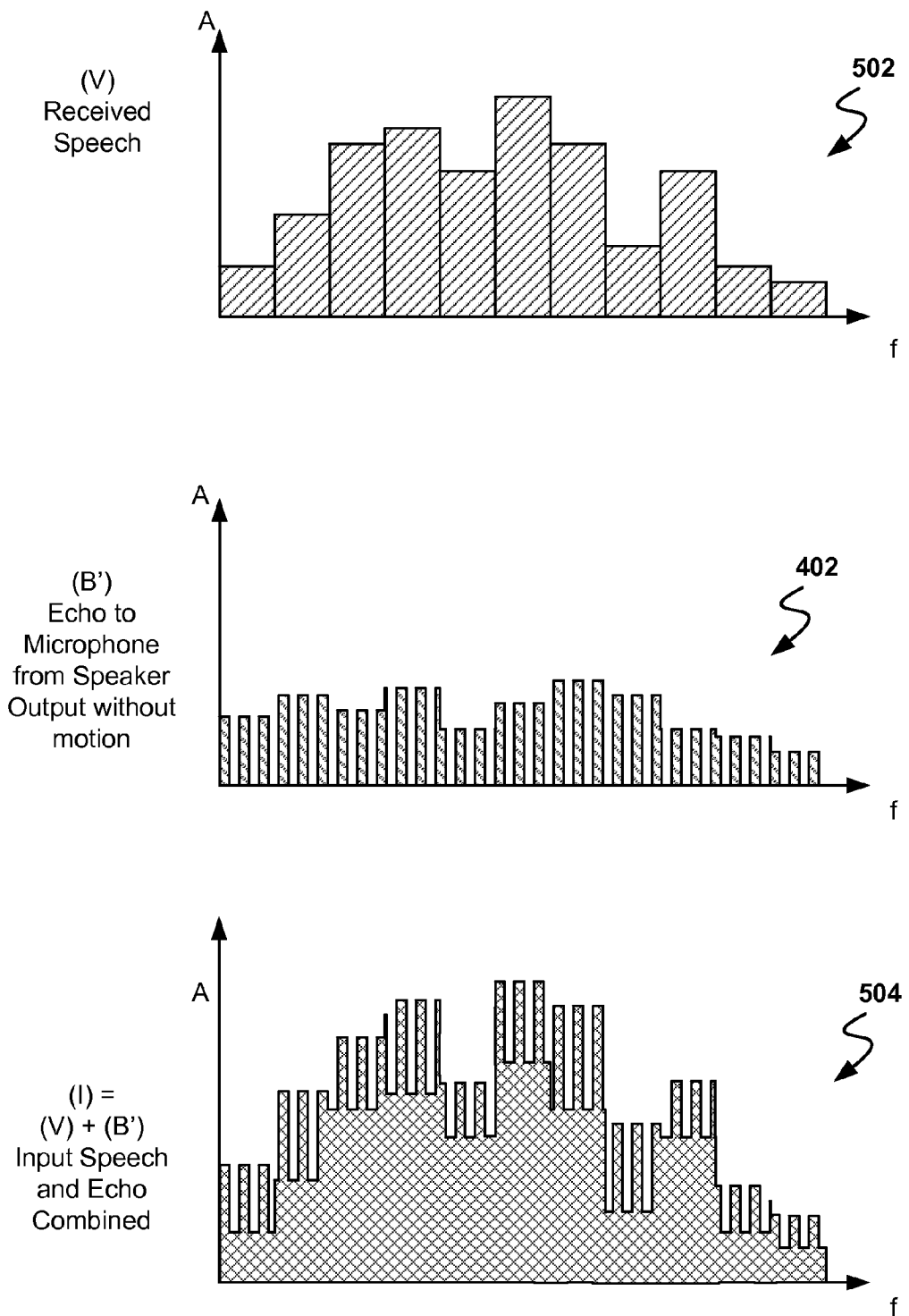
FIGS. 5A-5B illustrate the processing of an input signal captured by the microphone before transmittal over a network, according to one embodiment.
Figure 5B:
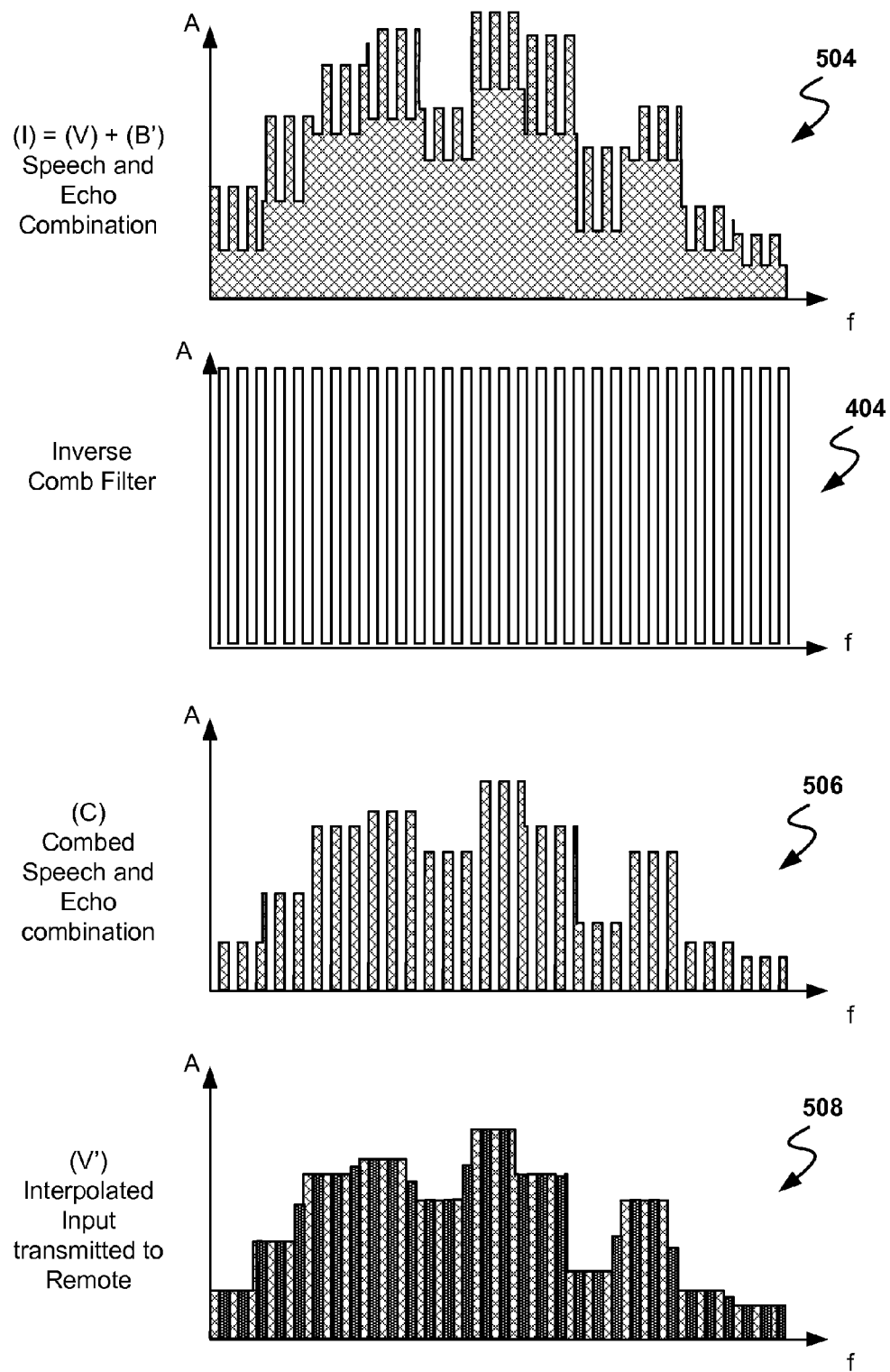

FIGS. 5A-5B illustrate the processing of an input signal captured by the microphone before transmittal over a network, according to one embodiment. Diagram 502 in FIG. 5A illustrates a speech signal (V) received via microphone. Diagram 402 illustrates the echo signal (B') received by the same microphone, as described above with reference to FIG. 4, which is the echo from the signal (B) sent through the speaker.

Since the microphone captures both the speech generated (V) by the user and the echo signal (B'), the input (I) received by the microphone is the combination of both signals, as shown in diagram 504. Therefore, input signal (I) is equal to the addition of speech signal (V) and echo signal (B'). As discussed above, the speech signal (V) is the unmodulated desirable signal (intelligence), and the echo signal is a frequency domain modulated signal (noise). The goal is to separate the noise from the intelligence signal.

FIG. 5B illustrates the processing of the input signal before transmitting the speech to the remote entity over the network. The inverse comb filter 404 is applied to the input signal (I), resulting in a combed signal (C) 506 which is the combination of speech and echo.

As previously discussed with reference to FIG. 4, the inverse comb filter is utilized to remove the echo signal. Therefore, signal (C) includes a filtered (i.e., combed) input signal (V) without the echo noise. The echo noise is eliminated because the frequency bands allowed to be transmitted by the speakers are the same frequency bands that are eliminated by the inverse comb filter. The result is an undersampled intelligence signal (C).

In one embodiment, signal (C) is reconstituted through frequency interpolation before being transmitted. The interpolation is performed to improve the sound quality, as well as to eliminate possible interference with a similar echo suppression system that may be taking place at the other end.

In general, interpolation is a method of constructing new data points within the range of a discrete set of known data points. When a finite number of data points are known, interpolation is sometimes used to estimate the value of the function for other points whose value is not known. This may be achieved by curve fitting or regression analysis. Embodiments presented herein may utilize different forms of interpolation, such as linear interpolation, where a straight line is drawn between two neighboring samples to determine values of the function between the two neighboring samples.

With respect to frequency interpolation, the interpolation process would fill in the gaps in the cut-through bands by assigning values within these bands based on the values of the neighbor pass-through bands. For example, in one embodiment, the signal amplitude within an interpolated band would be equal to an average of the amplitude values on the bands to the left and to the right of the interpolated band. In another embodiment, the interpolated band would be filled with a value equal to one of the neighbor bands (e.g., the band to the left or the band to the right). In other embodiments, the interpolation of a frequency band may utilize the values from more than two neighbor frequency bands. Any type of interpolation scheme may be used in order to interpolate signal (C).

The result of interpolating signal (C) is signal (V'), which is transmitted to the remote entity, as illustrated in diagram 508. The sharpness of the comb filter permits the interpolation of the missing input bands, resulting in no effective loss of intelligence in the input signal. With an adequate sharpness on the bands of the comb, it is possible to reconstruct the speed signal (V) without being audibly detectable to a human, assuming a scaled increase of the output amplitude of the audio signal to make up for the loss of aggregate output signal due to the comb.

Figure 6B:
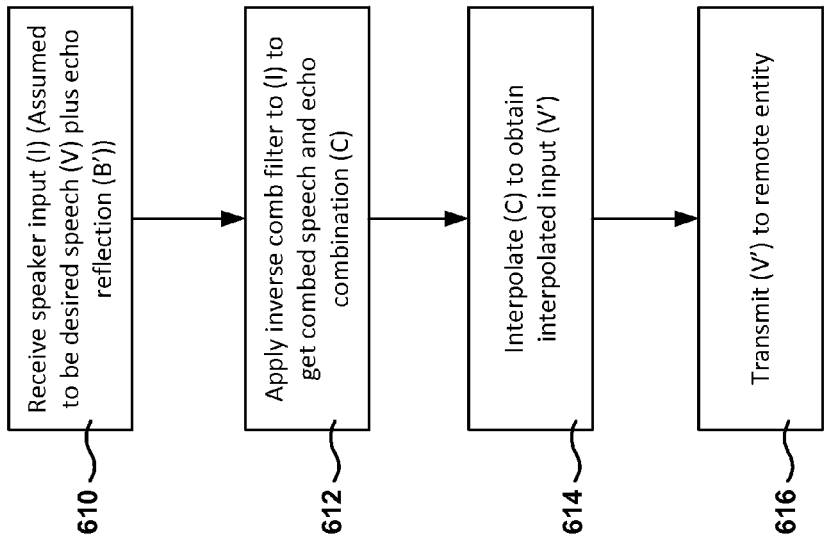
FIG. 6B is a flowchart for processing audio before transmission, according to some embodiments.
Figure 6A:
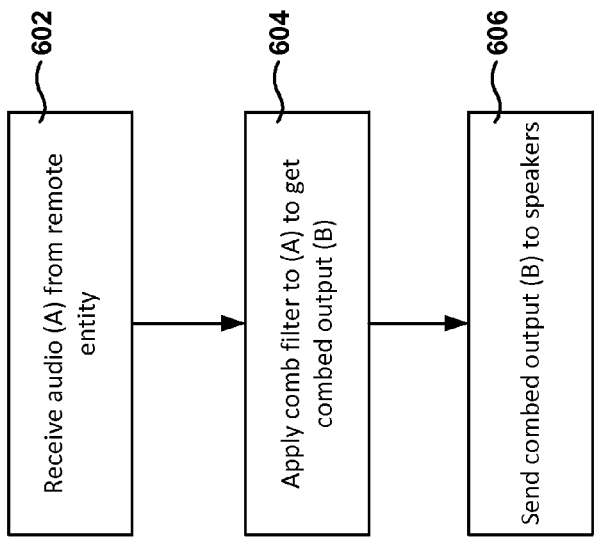
FIG. 6A is a flowchart for processing the audio output, according to some embodiments.

FIG. 6A is a flowchart for processing the audio output, according to some embodiments. While the various operations in this flowchart are presented and described sequentially, one of ordinary skill will appreciate that some or all of the operations may be executed in a different order, be combined or omitted, or be executed in parallel.

As used herein, audio output refers to the signal sent to the speaker, and audio input refers to the signal received by the microphone. In operation 602, an audio signal (A) is received from a remote entity which is engaged in voice communications with a local entity. See for example signal (A) received by communications module 202 of FIG. 2.

From operation 602, the method flows to operation 604 where a comb filter is applied to signal (A), resulting in combed output (B). From operation 604, the method flows to operation 606 where the combed output (B) is sent to one or more speakers. See for example signal (B) transmitted to speaker 110 from output processor 206 of FIG. 2.

In another embodiment, the comb filter is applied at a server instead of at the client coupled to the speaker. For example, communications server 120 of FIG. 2 can apply the comb filter before sending the audio to computing device 106. In this case, the computing device does not need to process the audio and sends the "combed" audio, received from communications server 120, directly to speaker 108 without need of further processing.

FIG. 6B is a flowchart for processing audio before transmission, according to some embodiments. While the various operations in this flowchart are presented and described sequentially, one of ordinary skill will appreciate that some or all of the operations may be executed in a different order, be combined or omitted, or be executed in parallel.

FIG. 6B illustrates the processing of the audio signal before the audio signal is transmitted to a remote party. In operation 610, and input signal (I) is received by the speaker. It is assumed that input signal (I) includes desired speech (V) (intelligence) and an echo reflection (B') (noise). The method illustrated herein eliminates the echo noise from the input signal (I).

From operation 610, the method flows to operation 612 where an inverse comb filter is applied to input signal (I). The result is a combed speech-and-echo combination signal (C). See for example diagram 506 of FIG. 5B.

From operation 612, the method flows to operation 614 where signal (C) is interpolated to fill in the empty frequency bands. The result is an interpolated signal (V'). See for example signal (V') sent from input processor 204 in FIG. 2 to communications module 202, which in turn sends (V') over the network 114 to the remote party. See also diagram 508 of FIG. 5B.

In another embodiment, the interpolation of signal (C) is performed at the server (e.g., communications server 120 of FIG. 2). In this case, the audio signal is transmitted to the communication server which then interpolates the signal to fill in the empty frequencies and transmit the filled signal to the other party.

In yet another embodiment, instead of interpolating the signal (C), a frequency shift is applied to the signal in order to have signal in the same frequency bands that are sent to the speaker. In this case, the receiving party would not need to comb the incoming audio because the incoming audio is already combed. If the comb filter is fine enough, the frequency shift will not be noticed by a user.

From operation 614, the method flows to operation 616 where the interpolated signal (V') is transmitted to the remote entity.

Figure 7:
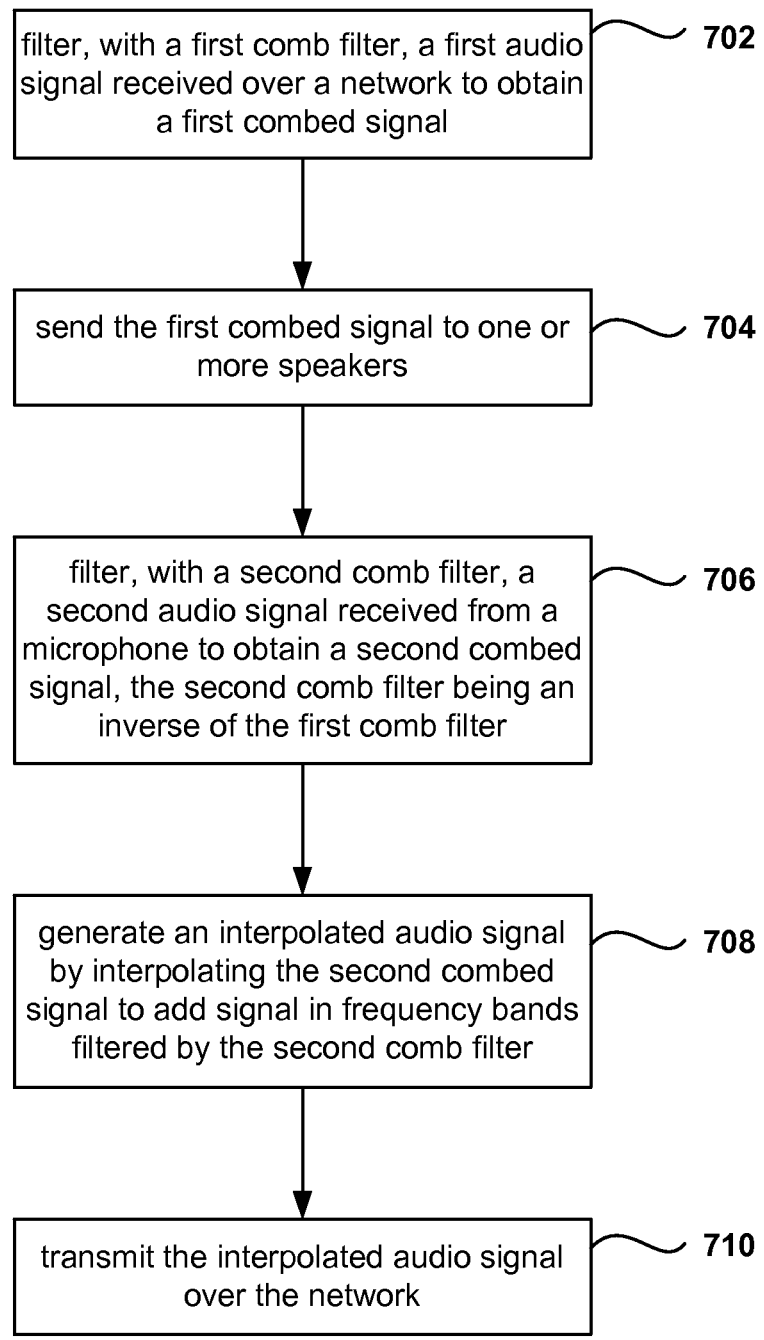
FIG. 7 is a flowchart for echo suppression, according to some embodiments.

FIG. 7 is a flowchart for echo suppression, according to some embodiments. While the various operations in this flowchart are presented and described sequentially, one of ordinary skill will appreciate that some or all of the operations may be executed in a different order, be combined or omitted, or be executed in parallel.

In operation 702, a first audio signal is filtered utilizing a first comb filter to obtain a first combed signal. The first audio signal is received over a network and is associated with a conversation held between to users situated in remote locations. The first audio signal may be for a phone conversation, or may be associated with a video conversation.

From operation 702, the method flows to operation 704 where the first combed signal obtained in operation 702 is sent to one or more speakers. See for example speaker 110 of FIG. 2. From operation 704, the method flows to operation 706 where a second audio signal is filtered with the second comb filter to obtain a second combed signal. The second audio signal is received from a microphone, and the second comb filter is the inverse of the first comb filter.

From operation 706, the method flows to operation 708 where an interpolated audio signal is generated by interpolating the second combed signal. The result of the interpolation is the addition of signal in frequency bands that were filtered by the second comb filter.

From operation 708, the method flows to operation 710 where the interpolated audio signal is transmitted over the network to the remote party.

Figure 8:
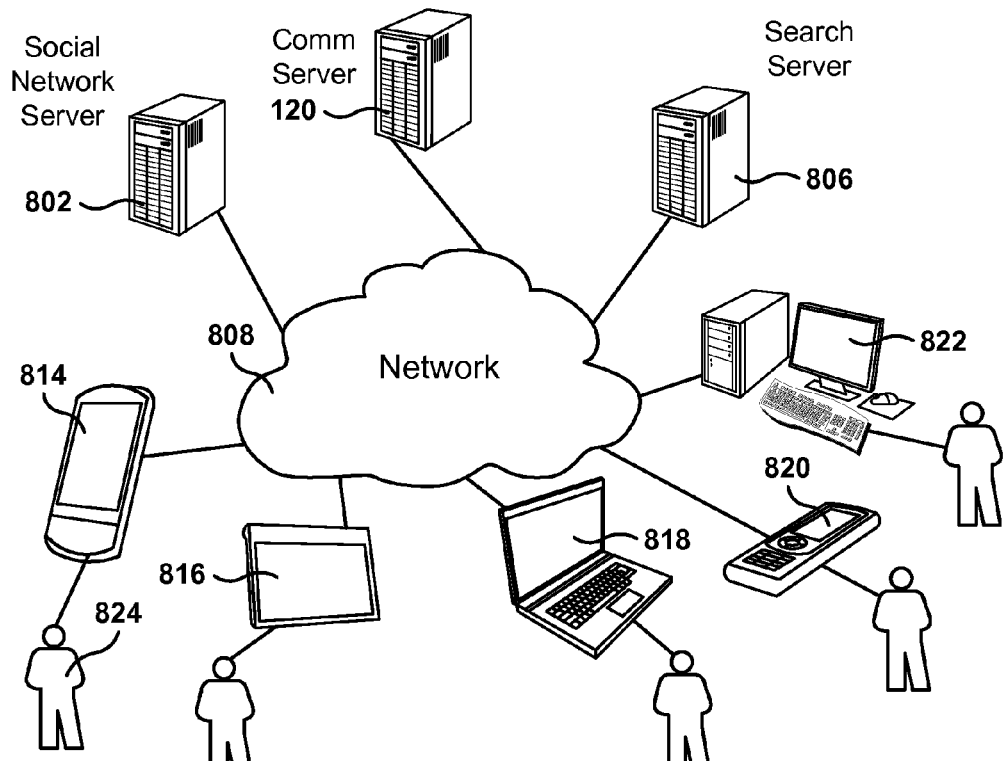
FIG. 8 provides a simplified schematic diagram of a system that may utilize several implementations described herein.

FIG. 8 provides one example architecture of a system that may utilize several implementations described herein. Users 824 interact with servers and with other users via network 808. The user may access the servers' services through different devices, including a smart phone 814, a tablet computer 816, a laptop 818, a mobile phone 820, a personal computer 822, or any computing device that provides access to the Network 808. Of course, the illustrated devices are only examples.

In several implementations, communications server 120 manages communication exchanges between users. The communication server 120 sets up, maintains, and terminates network conversations between users. A search server 806 provides web search capabilities for the client devices. A social network server 802 provides social network capabilities, including setting up communications between users linked with each other in the social network. However, social links are not required to practice embodiments described herein, as any two entities exchanging audio over the network may utilize the echo suppression methods and systems presented herein.

Other implementations may utilize different servers, have the functionality of one server distributed over a plurality of servers, have the functionality of two or more servers combined into a single server, etc. The implementations illustrated in FIG. 8 should therefore not be interpreted to be exclusive or limiting.

Figure 9:
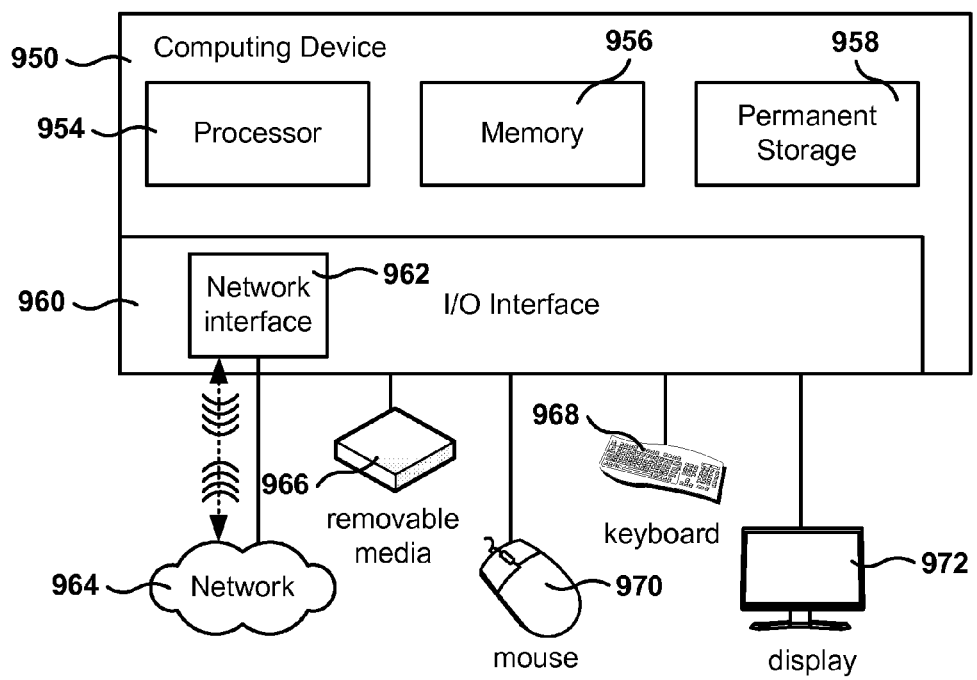
FIG. 9 is a simplified schematic diagram of a computer system for executing implementations described herein.

FIG. 9 is a simplified schematic diagram of a computer system for executing implementations described herein. It should be appreciated that the methods described herein may be performed with a digital processing system (e.g., a conventional, general-purpose computer system). Special purpose computers, which are designed or programmed to perform only one function, may be used in the alternative. The computing device 950 includes a processor 954, which is coupled through a bus to memory 956, permanent storage 958, and Input/Output (I/O) interface 960.

Permanent storage 958 represents a persistent data storage device like a hard drive or a USB drive, which may be local or remote. Network interface 962 provides connections via network 964, allowing messaging (wired or wireless) with other devices. It should be appreciated that processor 954 may be embodied in a general-purpose processor, a special purpose processor, or a specially programmed logic device. Input/Output (I/O) interface 960 provides messaging with different peripherals and is connected with processor 954, memory 956, and permanent storage 958, through the bus. Sample peripherals include display 972, keyboard 968, mouse 970, removable media device 966, etc.

Display 972 is defined to display the user interfaces described herein. Keyboard 968, mouse 970, removable media device 966, and other peripherals are coupled to I/O interface 960 in order to exchange information with processor 954. It should be appreciated that data to and from external devices may be transferred through I/O interface 960. Several implementations can also be practiced in distributed computing environments where tasks are performed by remote processing devices that are linked through a wired or a wireless network.

Implementations can be fabricated as computer readable code on a non-transitory computer readable storage medium. The non-transitory computer readable storage medium holds data which can be read by a computer system. Examples of the non-transitory computer readable storage medium include permanent storage 958, network attached storage (NAS), read-only memory or random-access memory in memory module 956, Compact Discs (CD), Blu-Ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor (e.g., processor 954 of FIG. 9). Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Several implementations presented herein recite a device or apparatus. The apparatus may be specially constructed for the required purpose or may be a general purpose computer. The apparatus includes a processor capable of executing the program instructions of the computer programs presented herein.

Although the foregoing implementations have been described with a certain level of detail for purposes of clarity, it is noted that certain changes and modifications can be practiced within the scope of the appended claims. Accordingly, the provided implementations are to be considered illustrative and not restrictive, not limited by the details presented herein, and may be modified within the scope and equivalents of the appended claims.

What is claimed is:

1. A method comprising:
   filtering, with a comb filter in proximity to one or more speakers, a first audio signal received over a network to obtain a first combed signal, wherein the comb filter comprises a plurality of frequency bands that alternate between first frequency bands that are removed from the first audio signal and second frequency bands that are passed through from the first audio signal to the first combed signal;
   sending the first combed signal to the one or more speakers;
   filtering, with an inverse of the comb filter in proximity to the one or more speakers, a second audio signal received from a microphone to obtain a second combed signal, wherein the second audio signal comprises an echo of the first combed signal outputted by the one or more speakers, wherein the microphone is in proximity to the one or more speakers and is operable to capture the echo of the first combed signal, and wherein the inverse of the comb filter removes the second frequency bands from the second audio signal and passes the first frequency bands through from the second audio signal to the second combed signal;

generating, by a processing device in proximity to the one or more speakers, an interpolated audio signal by interpolating amplitudes for the second frequency bands in the second combed signal that were removed from the second audio signal by the inverse of the comb filter; and transmitting the interpolated audio signal from the proximity of the one or more speakers over the network.

2. A method comprising:

filtering, with a comb filter, a first audio signal received at a first location over a network to obtain a first combed signal, wherein the comb filter comprises a plurality of frequency bands that alternate between first frequency bands that are removed from the first audio signal and second frequency bands that are passed through from the first audio signal to the first combed signal;

sending the first combed signal to one or more speakers at the first location;

filtering, with an inverse of the comb filter, a second audio signal received from a microphone at the first location to obtain a second combed signal, wherein the second audio signal comprises the first combed signal outputted by the one or more speakers, and wherein the inverse of the comb filter removes the second frequency bands from the second audio signal and passes the first frequency bands through from the second audio signal to the second combed signal;

generating, by a processing device at the first location, an interpolated audio signal by interpolating amplitudes for the second frequency bands in the second combed signal that were removed from the second audio signal by the inverse of the comb filter; and transmitting the interpolated audio signal from the first location over the network.

3. The method of claim 2, wherein a sharpness of the plurality of frequency bands is chosen so as to be audibly undetectable to humans.

4. The method of claim 2, wherein interpolating the amplitudes comprises one or more of averaging amplitudes of neighbors of each of the second frequency bands, assigning a same amplitude as the neighbors of each of the second frequency bands, fitting a curve to the amplitudes of the neighbors of each of the second frequency bands, performing regression analysis on the amplitudes of the neighbors of each of the second frequency bands, or performing linear interpolation on the amplitudes of the neighbors of each of the second frequency bands.

5. The method of claim 4, wherein the neighbors comprise one or more of the first frequency bands above or below each of the second frequency bands.

6. The method of claim 2, wherein the second audio signal further comprises an echo of the first combed signal outputted by the one or more speakers.

7. The method of claim 2, wherein the microphone and the one or more speakers are coupled to a personal computer.

8. The method of claim 2, wherein the microphone and the one or more speakers are integrated within a mobile phone.

9. The method of claim 2, further comprising:

interfacing with a communication server over the network to set up an audio conversation over the network.

10. The method of claim 2, wherein the plurality of frequency bands are of equal size.

11. A system comprising:

one or more speakers at a first location;

a microphone at the first location; and a processor at the first location operable to:

filter, with a comb filter, a first audio signal received at the first location over a network to obtain a first combed signal, wherein the comb filter comprises a plurality of frequency bands that alternate between first frequency bands that are removed from the first audio signal and second frequency bands that are passed through from the first audio signal to the first combed signal;

send the first combed signal to the one or more speakers at the first location;

filter, with an inverse of the comb filter, a second audio signal received from the microphone at the first location to obtain a second combed signal, wherein the second audio signal comprises the first combed signal outputted by the one or more speakers, and wherein the inverse of the comb filter removes the second frequency bands from the second audio signal and passes the first frequency bands through from the second audio signal to the second combed signal;

generate an interpolated audio signal by interpolating amplitudes for the second frequency bands in the second combed signal that were removed from the second audio signal by the inverse of the comb filter; and transmit the interpolated audio signal from the first location over the network.

12. The system of claim 11, wherein a sharpness of the plurality of frequency bands is chosen so as to be audibly undetectable to humans.

13. The system of claim 12, wherein interpolating the amplitudes comprises one or more of averaging amplitudes of neighbors of each of the second frequency bands, assigning a same amplitude as the neighbors of each of the second frequency bands, fitting a curve to the amplitudes of the neighbors of each of the second frequency bands, performing regression analysis on the amplitudes of the neighbors of each of the second frequency bands, or performing linear interpolation on the amplitudes of the neighbors of each of the second frequency bands.

14. The system of claim 13, wherein the neighbors comprise one or more of the first frequency bands above or below each of the second frequency bands.

15. The system of claim 11, wherein the second audio signal further comprises an echo of the first combed signal outputted by the one or more speakers.

16. The system of claim 11, wherein the microphone and the one or more speakers are coupled to a personal computer.

17. The system of claim 11, wherein the microphone and the one or more speakers are integrated within a mobile phone.

18. The system of claim 11, further comprising:

a communications module operable to interface with a communication server over the network to set up an audio conversation over the network.

19. The system of claim 11, wherein the plurality of frequency bands are of equal size.

20. A non-transitory machine-readable storage medium storing instructions that, when executed, cause a processing device to:

filter, with a comb filter, a first audio signal received at a first location over a network to obtain a first combed signal, wherein the comb filter comprises a plurality of frequency bands that alternate between first frequency bands that are removed from the first audio signal and second frequency bands that are passed through from the first audio signal to the first combed signal;

send the first combed signal to one or more speakers at the first location;

filter, with an inverse of the comb filter, a second audio signal received from a microphone at the first location to obtain a second combed signal, wherein the second audio signal comprises an echo of the first combed signal outputted by the one or more speakers, and wherein the inverse of the comb filter removes the second frequency bands from the second audio signal and passes the first frequency bands through from the second audio signal to the second combed signal;

generate, by the processing device at the first location, an interpolated audio signal by interpolating amplitudes for the second frequency bands in the second combed signal that were removed from the second audio signal by the inverse of the comb filter; and transmit the interpolated audio signal from the first location over the network.

* * * * *